(No Model.)
S. D. WRIGHT & J. W. HORNSEY.
SECTIONAL CHILL FOR WHEEL HUBS.
No. 515,102. Patented Feb. 20, 1894.
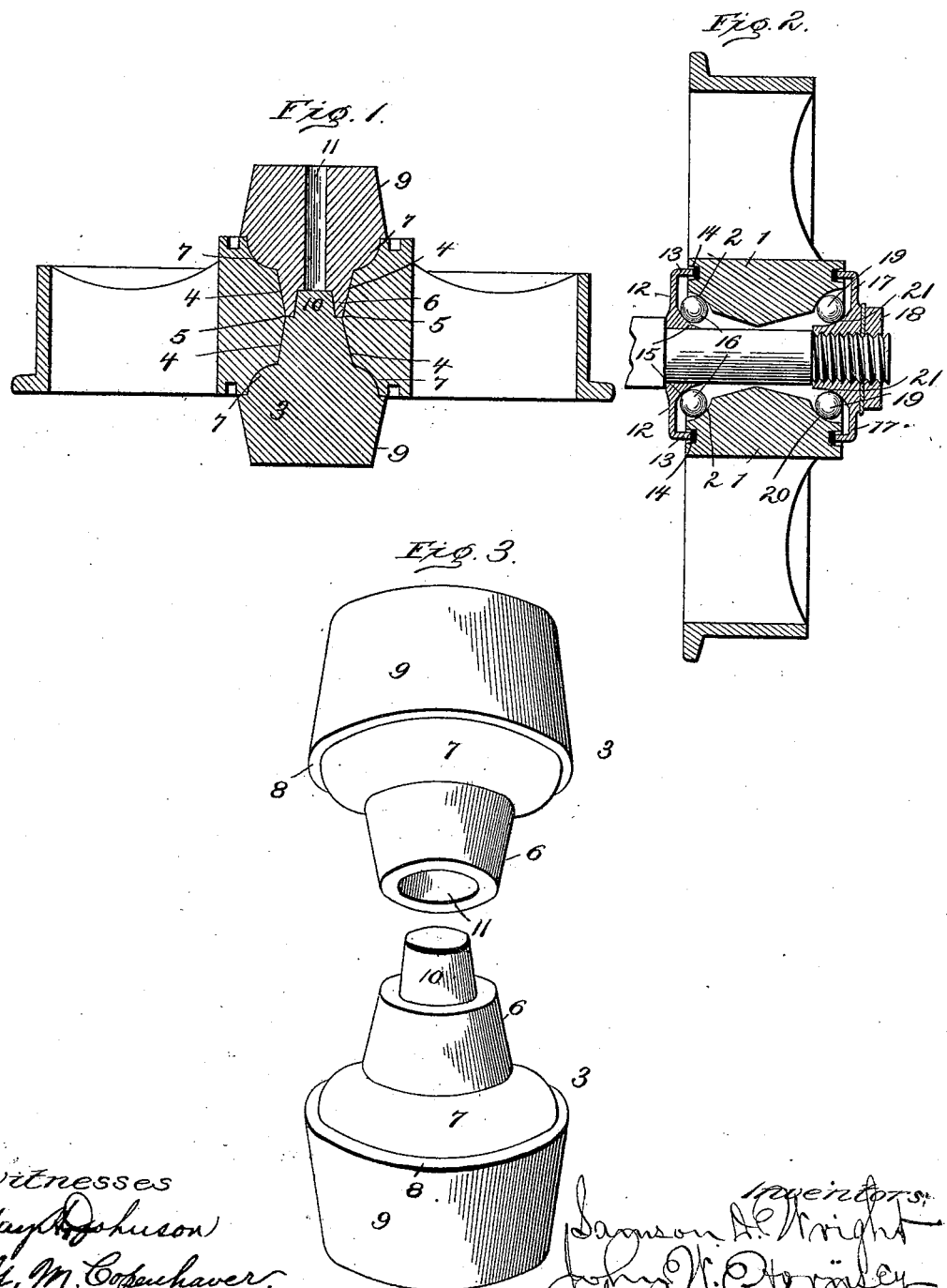

UNITED STATES PATENT OFFICE.

SAMSON D. WRIGHT AND JOHN W. HORNSEY, OF CLEVELAND, OHIO, ASSIGNORS TO THE BALL BEARING CAR WHEEL MANUFACTURING COMPANY, OF SAME PLACE.

SECTIONAL CHILL FOR WHEEL-HUBS.

SPECIFICATION forming part of Letters Patent No. 515,102, dated February 20, 1894.

Application filed June 8, 1893. Serial No. 477,011. (No model.)

*To all whom it may concern:*

Be it known that we, SAMSON D. WRIGHT and JOHN W. HORNSEY, citizens of the United States, and residents of the city of Cleveland, in the county of Cuyahoga and State of Ohio, have invented certain new and useful Improvements in Sectional Chills for Wheel-Hubs and Bearing-Seats Thereof, of which the following is a specification.

Our improvement resides in the provision of a sectional chill for making car wheel-hubs with chilled seats for ball bearings, and in the manner whereby the hub is chilled to produce hard and finished seat bearings in the operation of casting the wheel.

Our improvement is the result of much experimenting in the use of ball bearings for the wheels and axles of coal, freight and mining cars; and as the successful use of ball bearings requires that the seats therefor must be hard and smooth and finished in the operation of casting the wheel, we have produced for this purpose, a chill-core of separable parts, each part the counter part of annular seats formed in each end of the hub, whereby the said core is made to form the mold for the central opening in the wheel-hub, and the chilled seats therein, and to be easily and quickly withdrawn from the hub after the casting operation in which the wheel is produced with its hub adapted for use with ball bearings. It is the provision in the chill-core for such withdrawal from the hub that renders its use practicable, for, in the absence of such provision we found it impossible to obtain a chilled hub produced in the operation of casting the wheel because the contact of the hot metal upon the chill-cores, will cause them to expand, while the hub in cooling contracts, and were it not therefore, for the provision in the form and construction of the chill-core, it would be impossible to withdraw the parts which form the separate seats as we have stated. The chilling of the hub, is moreover, important in giving greater strength and hardness to the hub. We know that chilled wear surfaces are old in the art as an internally chilled journal box, the walls whereof present interior continuous chilled bearing surfaces; that chilled linings and sleeves for bearings subjected to frictional wear have been used; and that the supporting part of journal-boxes have been chilled to render them hard and durable. But the chilled hub of the wheel in its purpose and function as produced by us is highly advantageous in connection with its use with ball bearings and is more durable and of greatly less expense than the use of steel linings for the same purpose.

In the claims concluding this specification we will specifically set out our improvements in connection with the accompanying drawings which illustrate our improvements and in which—

Figure 1 represents a central section of the wheel showing the method of chilling the hub in the operation of casting the wheel. Fig. 2 shows the wheel, hub-seats and axle in their relation to the ball bearings; and Fig. 3 shows the separable chill-core parts employed in producing a chilled hub.

The construction of the hub of the wheel is such as to adapt it for use with ball bearings and has no contact bearing upon the axle arm or journal. For this purpose the hub 1 is formed with annular seats 2, 20, concave in their cross section, around each end, standing outwardly and upwardly at the junction of the inner wall of the central opening and the ends of the hub. In the operation of casting the wheel the hub and its seats are chilled and this while increasing the strength of the hub gives the perfect finish to the seats and exact symmetrical position to these seats in relation to the axis of the axle. To obtain these advantages we have provided a chill-core of separable parts or sections 3, 3, the one being the counterpart of the other, and so form them as to make the central opening of the wheel hub of a double cone, the tapering walls, 4, 4, whereof meet at a line 5, 5, preferably central with the width of the hub, and from which the walls flare to and terminate in the annular seats 2, 20, at each end of the hub and which are formed by the base of said chill-cores. For this purpose each core-part is formed with a truncated cone 6 which at its base terminates in a convex or bead like shoulder 7 which terminates in a shoulder 8 formed by an enlarged hub end 9, so that when joined at their truncated apices they form the perfect core for the interior walls and their counterpart in the annular seats of the hub. To give and maintain the perfect alignment of these core parts and to provide for their separation and removal from the wheel hub after the same has been cast, one of the core parts is formed with a dowel pin 10, for engaging a central opening 11 in the other part, thereby centering and holding the joined parts in true line with each other and with the axis of the hub. It will be understood that these core parts stand vertical in the flask with the part having the center opening 11 on top, and that after the casting is made, the wheel is raised at one side and by a hard wood stick inserted in the opening of the upper core part, the lower core part is driven out from the hub. The wheel is then raised on edge or turned over, and the other core part driven out, and it is the construction of these chill-core parts that forms and chills the bearing seats in the way described. Now, as it is in this method of forming the hub of a wheel with hard and smooth seats for confining ball bearings that enables us to use such bearings in car wheels without the use of oil and its attendant expense and objections, it is deemed proper to show and describe such wheel in connection with the axle on which it is mounted but has no bearing contact upon the axle arm or journal.

Referring to Fig. 2 the axle arm has a collar 12 which is forced by compression so as to insure solidity and trueness as a fixed part of the axle. The diameter of this collar is a little less than that of the wheel hub and its circumference terminates in an inward standing rim 13 for co-operation with grooves 14 in the ends of the hub. The inner wall of this fixed collar at its junction with the axle arm is formed with an annular seat 15 which is concave in its cross section and stands inward and downward and forms a seating and raceway, which, in conjunction with the hub and annular seat first described serve as the confining bearings for a row of balls 16 upon which the wheel is supported and has a rolling bearing. This collar is made of hardened wrought iron or steel so that all the wear surfaces will be equally hard. A collar 17 of identical construction with the fixed collar is screwed upon the threaded end of the axle-arm and held in place by a jam-nut 18 and an interposed washer. Between this collar and the outer end of the hub a row of balls 19 is confined between and within co-incident hub and collar seats 20, 21, and upon these two end rows of balls, the wheel is seated, balanced and supported free of the axle arm and revolves freely upon said balls. We compress the inner collar upon the axle so that it will serve as a fixed abutment against which the perfect alignment of the wheel is both made and maintained by the adjustable collar and nut. For, were this collar 12 free for rotation upon the axle-arm it would produce wear both upon the arm and upon the shoulder of the axle and cause an unsteady, untrue and wabbling support of the wheel at that side and thereby not only destroy its alignment in relation to the axle, but the perfect balance of the wheel upon the balls and thereby produce wear at every point. It will be understood that the surface parts 6, 7, and 8, of each chill-part, is the exact counterpart of the interior chilled walls of the hub and form the annular seats 2 and 20 at the ends of the hub.

We claim as our improvement—

1. A chill for forming the central opening and bearing seats of a car wheel-hub, constructed of two parts of identical form, each having a tapering part forming the inner walls of the hub opening and a convex bead joining said tapering part and forming the bearing seats at each end of the hub, as described.

2. A chill for forming the central opening and bearing seats of a car wheel hub, consisting of two parts of identical form, each having a meeting tapering part and terminating in a convex diameter bead, which terminates in a shoulder at right angles to the axis of the joined parts, and provision for holding the counterparts in alignment and for effecting their separation from the hub after the casting operation, as set forth.

3. The within described chill for use in molding the central opening and bearing seats of a car wheel-hub, consisting of two parts of identical form, each having a meeting tapering part and a convex bead, one of said counterparts having an axial dowel pin and the other part having a central opening, substantially as described for the purpose stated.

In testimony whereof we have hereunto signed this specification in the presence of witnesses.

SAMSON D. WRIGHT.
JOHN W. HORNSEY.

Witnesses:
M. MILLARD,
E. F. WRIGHT.